P. STONER.
HEADSTOCK FOR LATHES.
APPLICATION FILED NOV. 18, 1920.
1,428,190.
Patented Sept. 5, 1922.
2 SHEETS—SHEET 1.
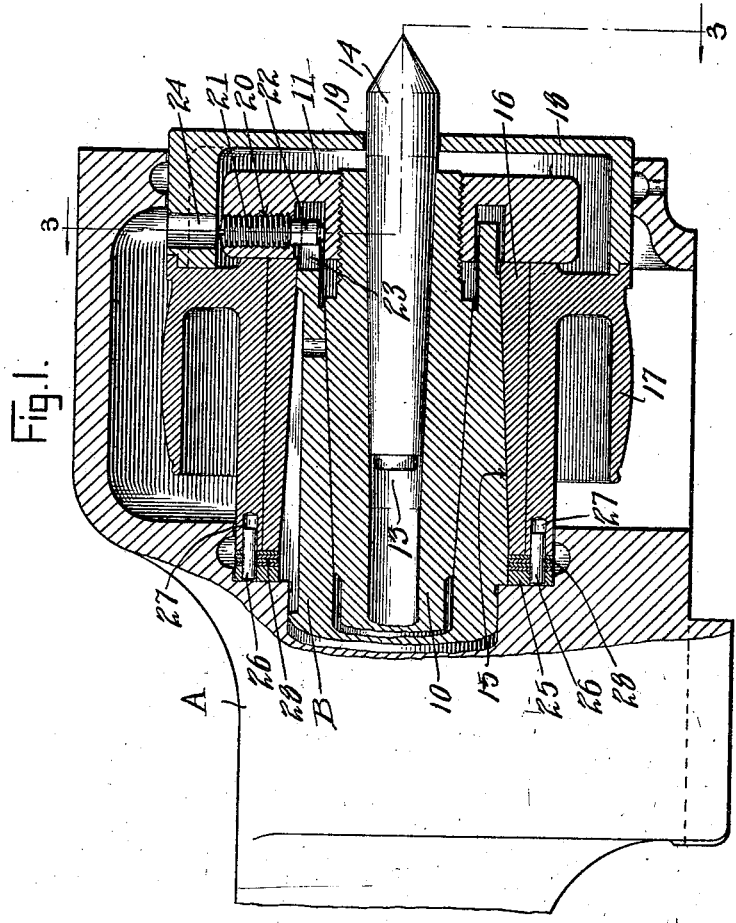
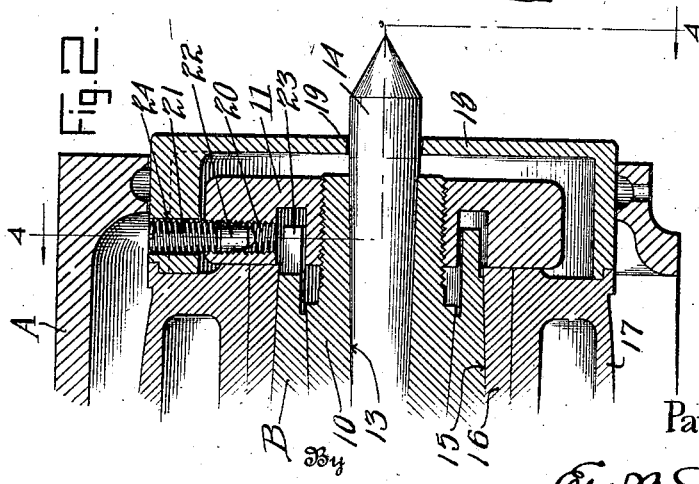
Inventor
Paul Stoner
Attorney P. STONER.
HEADSTOCK FOR LATHES.
APPLICATION FILED NOV. 18, 1920.
1,428,190.
Patented Sept. 5, 1922.
2 SHEETS—SHEET 2.
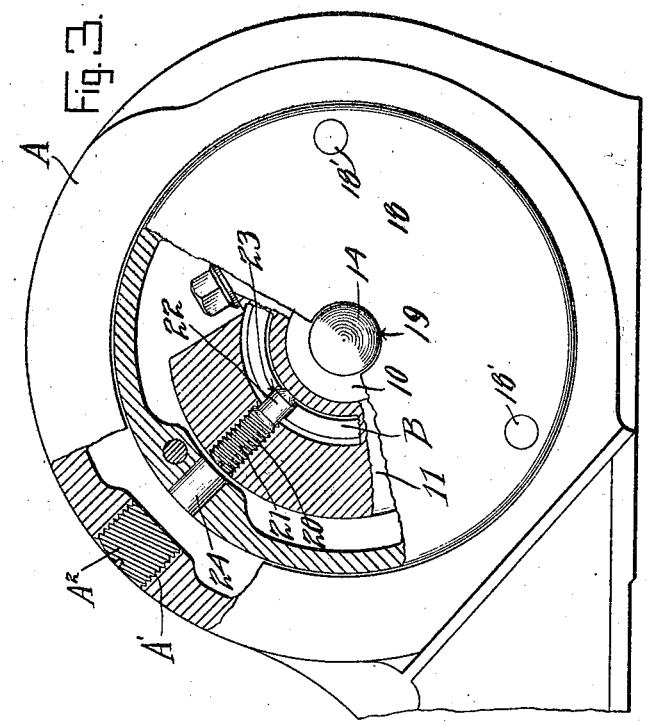
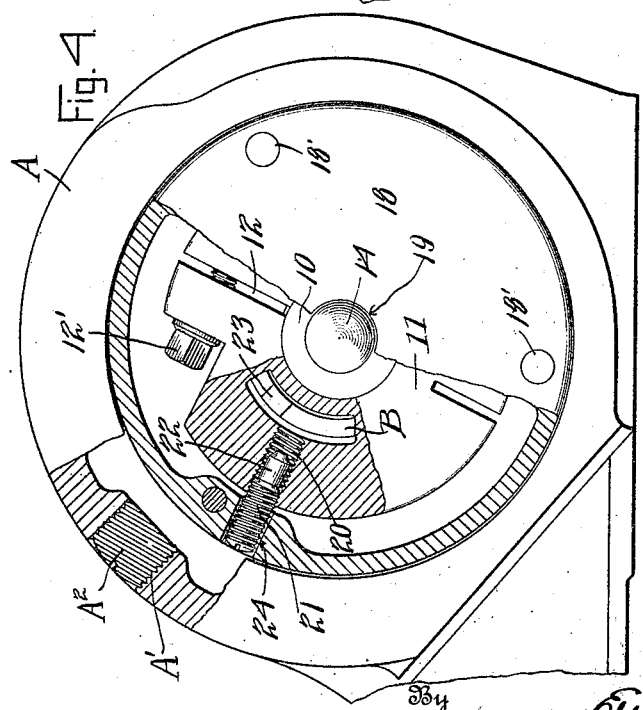
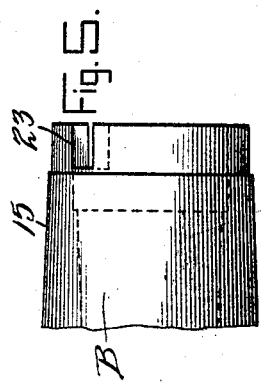
Inventor
Paul Stoner Patented Sept. 5, 1922.

1,428,190

UNITED STATES PATENT OFFICE.

PAUL STONER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

HEADSTOCK FOR LATHES.

Application filed November 18, 1920. Serial No. 424,903.

*To all whom it may concern:*

Be it known that I, PAUL STONER, a citizen of the United States, residing at Waynesboro, in the county of Franklin and State of Pennsylvania, have invented certain new and useful Improvements in Headstocks for Lathes, of which the following is a specification.

My invention relates to a headstock for lathes. The main object of said invention is to provide a work center that can be made stationary or revolvable at the will of the operator.

Another object is to positively lock the work center against rotation while permitting rotation of the face plate.

Referring to the accompanying drawings which are made a part hereof and on which similar reference characters indicate similar parts, Figure 1 is a longitudinal section through the head stock showing the parts in position when the work center is stationary;

Figure 2, a similar view when the work center is free to revolve with the face plate;

Figure 3, a section on the line 3—3 of Figure 1;

Figure 4, a section on the line 4—4 of Figure 2; and

Figure 5, a detail view of the end of the spindle bearing.

In the drawings, the character A represents the headstock in which is securely mounted the spindle bearing B bored and tapered to form a bearing surface for the main spindle 10. This spindle is in turn threaded at its extreme end for the reception of a screw collar 11 slotted on one side as at 12 in Figure 4 and adapted to receive a screw 12' for securely locking it to the spindle 10. The spindle 10 is provided with a tapered bore 13 adapted to receive a work center 14 of the usual construction. The spindle bearing B is reversely tapered on its outer surface as at 15 to receive a bearing sleeve 16 upon which is shrunken the pulley 17 which has a face plate 18 fastened by screws 18' to its outer face and is provided with a central aperture 12 through which projects the work center 14.

Threaded into an aperture 20 in the collar 11 is a machine screw 21 provided with a smooth cylindrical end 22 adapted to enter a slot 23 in the spindle bearing B when it is desired to have the work center stationary or "dead," and adapted to have its slotted end engage a smooth bore 24 in the flange of the face plate 18 when it is desired to have the work center revolvable or "live."

As a means of adjusting the pulley to take up the wear on the bearing, a collar 25 is provided which is mounted on two or more pins 26 inserted into openings 27 in the hub of the pulley 17. Also mounted on these pins and between the collar 25 and hub of the pulley is a series of relatively thin collars or washers 28 which may be removed one at a time to permit the pulley and its attached sleeve 16 to be moved up along the tapered portion of the bearing B by rotating collar 11, so as to compensate for wear between sleeve 16 and bearing B.

The headstock A is provided with a threaded opening $A^1$ through which a screwdriver may be inserted for the purpose of changing the position of the screw 21. A screw plug $A^2$ closes the opening $A^1$ when the latter is not in use.

In the device described, the face plate is always active, but by merely removing the screw plug $A^2$ and adjusting screw 21, the work spindle may be rendered either revolvable or stationary at the will of the operator.

While I have described my invention with reference to the headstock of a lathe, I do not limit myself to such use, and the specific terms used are intended for description and not for limitation. I may also vary the structural details shown and described herein, within the scope of the invention defined in the appended claims.

Having thus fully described my invention, what I claim as new and desire to secure by Letters Patent, is:

1. In combination a work-holding center, a spindle therefor, a stationary bearing having an inner bearing surface in contact with the spindle, a rotary device concentric with the spindle and means located forwardly of said bearing surface for connecting the spindle to either said stationary bearing or said rotary device, substantially as set forth.

2. In combination, a work-holding center, a stationary device and a rotary device concentric therewith, and a unitary device radially movable for connecting the center alternately to either of said devices.

3. In combination, a work center, a spindle therefor, a stationary device and a rotary device concentric therewith, and a flange connected to the spindle and extending between said devices, said flange adapted to be connected to either the rotary or the stationary device.

4. In combination, a work center, a flanged member rigidly connected with the center, a screw plug extending through the flange of said member and means adapted to engage with opposite ends of the screw-plug to render the center rotary or stationary, substantially as set forth.

5. In a headstock for lathes, a work-holding center, a collar fast thereto having a flange, a stationary bearing sleeve and a rotary face-plate each having a flange, said three flanges having apertures adapted to be aligned, and a screw-plug adapted to engage the intermediate flange and either of the others, substatially as set forth.

6. In a headstock for lathes, a casing having an aperture, a work-holding center, a collar fast thereto having a flange, a stationary bearing sleeve and a face-plate each having a flange, said three flanges having apertures adapted to be aligned with each other and the aperture in the casing, and a screw-plug adapted to pass through the aperture in the casing and engage the intermediate flange and either of the others, substantially as set forth.

7. In a stock for a lathe, a center, a spindle therefor, a stationary spindle bearing, a pulley loosely mounted on the bearing, a face plate on the pulley, the spindle bearing and face-plate having openings and means rigidly connected to the center and adapted to engage either one of said openings.

8. In a stock for a lathe, a center, a sleeve having an inner bear surface and an outer bearing surface, a spindle for the center located in said sleeve, a driving pulley located on the outer bearing surface of the sleeve, and means to connect the spindle to either the sleeve or the pulley.

9. In a headstock for lathes, a center, a spindle therefor, a collar adjustable on the spindle, a loose pulley for driving the spindle and means adapted to lock the collar to the pulley to drive the spindle.

10. A pulley having a fixed abutment adapted to contact therewith at one end, an adjustable abutment in contact therewith at the other and wear compensating means between the pulley and the fixed abutment, substantially as set forth.

11. A pulley having a fixed abutment adapted to contact therewith at one end, an adjustable abutment in contact therewith at the other end and a series of washers between the pulley and the fixed abutment, substantially as set forth.

12. In a wear compensating device, a tapered bearing, an internally-tapered pulley thereon, an adjustable abutment adapted to move the pulley to compensate for wear between its inner surface and the bearing, a fixed abutment at the other end of the pulley, and washers between the pulley and the fixed abutment, substantially as set forth.

13. In a headstock for lathes, a centering-bearing spindle, a pulley, a sleeve having bearing surfaces for engagement by the pulley and the spindle, the contacting faces of the pulley and sleeve being tapered, and means carried by the spindle for moving the pulley to compensate for wear between it and the sleeve, substantially as set forth.

14. In a headstock for a lathe, a center, a spindle therefor, a pulley, a fixed abutment at one end of the pulley, washers between the pulley and said abutment, a collar threaded on the spindle and bearing against the other end of the pulley and means to lock the collar to the spindle, substantially as set forth.

15. A headstock of the class described comprising a casing, a stationary spindle therein having bearing surfaces inside and outside, a pulley running on its outer bearing surface, a face plate secured to said pulley, a spindle mounted to revolve within said bearing and carry a work-holding center, a collar screwed on the end of said spindle and adapted to engage the side of said pulley and means for securing the face plate to said collar or said collar to said bearing, substantially as set forth.

16. The combination of a fixed spindle bearing, a pulley journaled on the outer surface thereof, said spindle bearing having a notch at one end, a face plate secured to said pulley, a radial opening in said face plate, a spindle within said bearing, a collar adjustably mounted on said spindle and a screw carried by said collar adapted to lock said collar to said face plate to impart motion to said spindle or engage said notch to hold the spindle stationary, substantially as set forth.

In witness whereof, I have hereunto set my hand and seal at Washington, District of Columbia this thirteenth day of November, A. D. nineteen hundred and twenty.

PAUL STONER.

Witnesses:
E. M. BRADFORD,
F. W. DAHN.